(No Model.) 2 Sheets—Sheet 1.

M. BROCHU.
LATHE FOR TURNING SPIRALS.

No. 419,167. Patented Jan. 7, 1890.

Witnesses
G. W. Shook
Lois Moulton

Inventor
Michael Brochu
By his Attorneys
Moulton & Rogers (No Model.) 2 Sheets—Sheet 2.

M. BROCHU.
LATHE FOR TURNING SPIRALS.

No. 419,167. Patented Jan. 7, 1890.

WITNESSES:

INVENTOR
Michael Brochu.
BY
Moulton & Rogers,
ATTORNEYS.

UNITED STATES PATENT OFFICE.

MICHAEL BROCHU, OF GRAND RAPIDS, MICHIGAN.

LATHE FOR TURNING SPIRALS.

SPECIFICATION forming part of Letters Patent No. 419,167, dated January 7, 1890.

Application filed July 27, 1889. Serial No. 318,959. (No model.)

*To all whom it may concern:*

Be it known that I, MICHAEL BROCHU, a citizen of the United States, residing at Grand Rapids, in the county of Kent and State of Michigan, have invented certain new and useful Improvements in Lathes for Turning Spirals; and I do hereby declare the following to be a full, clear, and exact description of the invention, such as will enable others skilled in the art to which it appertains to make and use the same.

My invention relates to a lathe for turning spirals, comprising rope-moldings, table-legs, and various forms of spirally-fluted woodwork; and it consists in the construction, combination, and arrangement of the various parts and details hereinafter particularly described, and pointed out in the claims, reference being had to the accompanying drawings.

Figure 1:
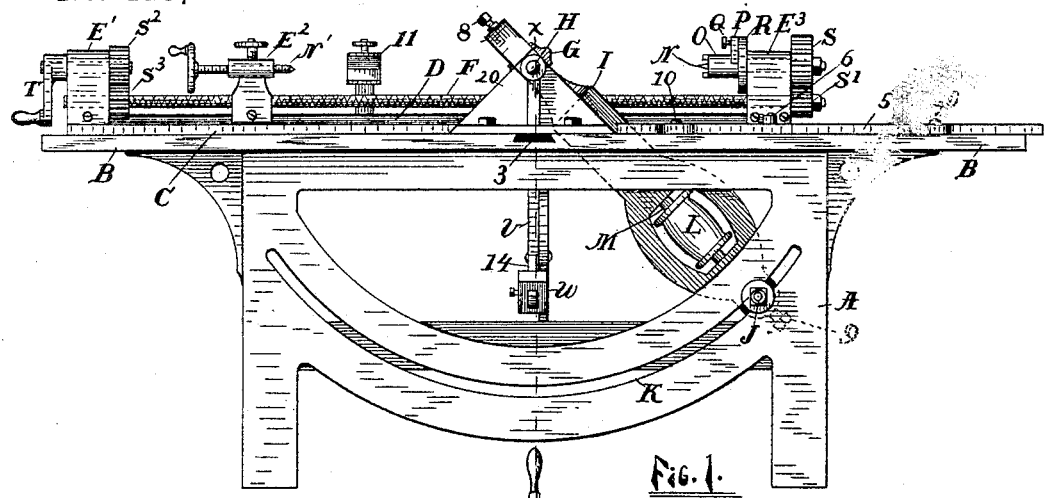
Figure 2:
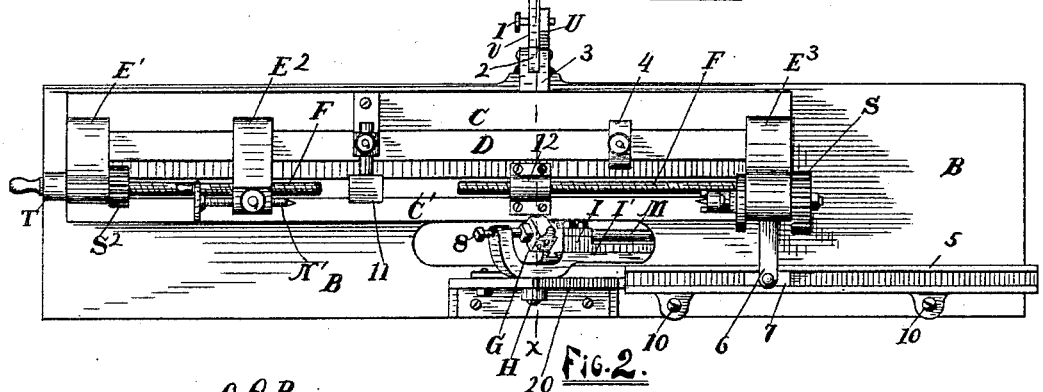
Figures 3, 4, 5, 6:
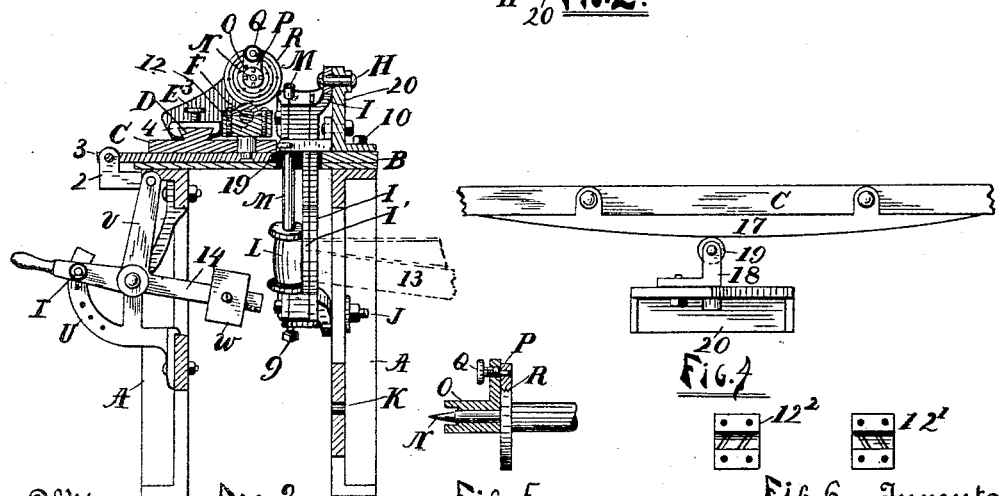
Figure 7:
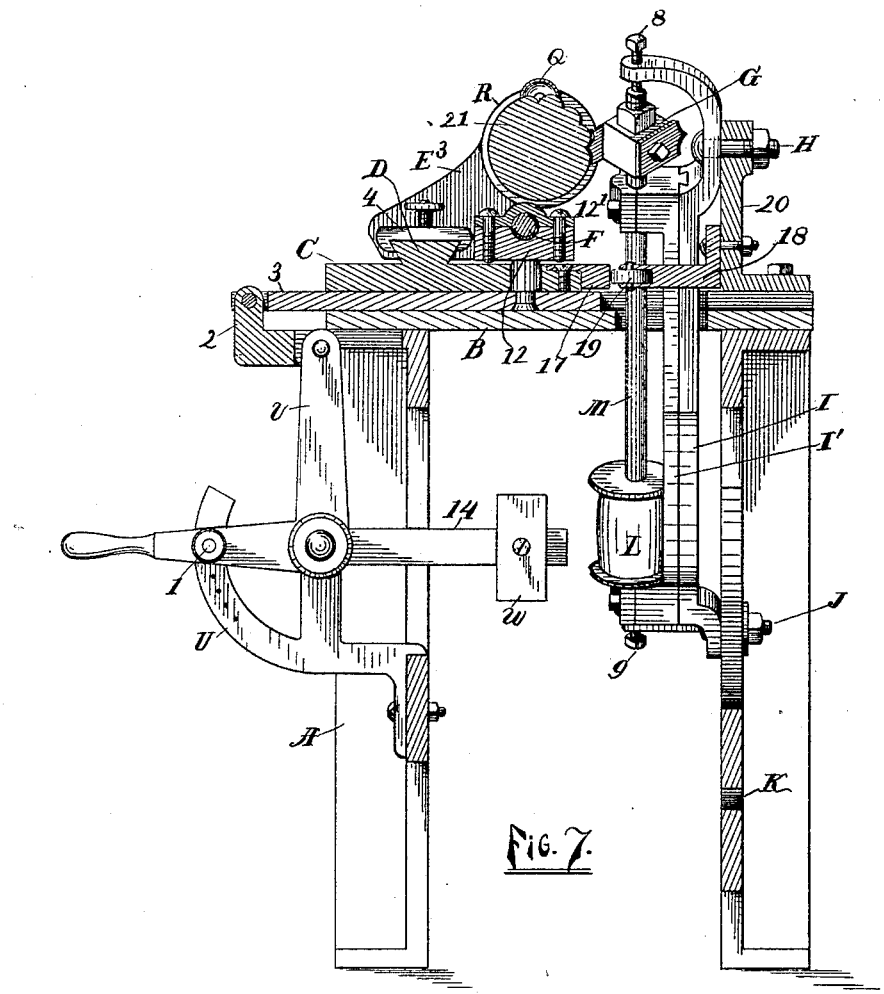

The object of my invention is to produce a machine adapted to operate upon irregular forms of work, upon fluted work having an irregular outline to produce any desired number of flutes, grooves, or strands, and that may be driven directly from a drum, thus dispensing with idle-pulleys. I accomplish these results by the mechanism illustrated, as follows:

Figure 1 is a rear elevation of a machine embodying my invention; Fig. 2, a plan view of the same; Fig. 3, a vertical section of the same on the line $x\ x$ of Figs. 1 and 2; Fig. 4, a detail showing plan of guide roll and pattern; Fig. 5, a detail of the driving-spindle and attachment for spacing the fluter or spirals; Fig. 6, right and left hand caps to engage with feed-screw; and Fig. 7, an enlarged sectional view showing the relation of the cutter-head to a piece of work 21 in position, and other relations of parts not shown in Fig. 3.

A represents any suitable frame, upon which rests the table B, upon which is placed the carriage C, adapted to move freely in various directions. Mounted upon the carriage is the dovetailed way D, to either end of which is attached the heads E' $E^3$, forming journal-bearings for the feed-screw F. $E^3$ also supports and forms a journal-bearing for the driving-spindle N, which is actuated by the feed-screw F, to which it is connected by the change-gears S S', said feed-screw being rotated by means of hand-crank T, through gears $S^2\ S^3$, and a shaft journaled in the upper part of the head E', said crank being arranged to clear the table A. The back center N' is supported in the head $E^2$, which is attached to and adjustable upon the way D, to accommodate the distance between the centers N N' to the various lengths of stock. Upon the driving-center N is the sleeve O, provided with spurs for engaging with the stock, and has an arm P, provided with a pin Q.

R is a face-plate secured to head $E^3$, and is provided with holes adapted to pin Q, arranged in concentric circles and differing in number in the various circles, and the arm P is provided with holes adapted to said pin Q and corresponding with the various circles.

In a suitable transverse groove in the table A is a slide 3, which is operated by a bell-crank lever V, having the arm 14, provided with the weight W, and the outer end of which forms a handle, which may be secured in any desired position by the pin 1 or a suitable latch engaging with holes arranged in the sector U, secured to A. Attached to the inner end of the slide 3 is a post 12, which is free to rotate upon its axis and passing through the slot C' in the carriage C is enlarged into a head, which is provided with a semi-cylindrical channel and which together with the cap, which is shown bolted thereon in Fig. 3, forms the box embracing the feed-screw F. Two of these caps 12' and $12^2$ are provided, having, respectively, right and left hand threads for engaging the respective right and left hand threads of said feed-screw. The channel in the head of 12 is devoid of threads. A guide-bar 5 is secured to the table by bolts 10, and is provided with a groove in which slides a block 7, pivoted to arm 6, attached to one end of the carriage for guiding the same.

I provide a number of knives suitable for the various kinds of work for which the machine is adapted. These knives are rigidly secured to the cutter-head G, which is secured to the spindle M, and may be in any suitable form. The spindle is journaled in a yoke pivoted at H opposite to the center of the cutter-head to the bracket 20, which is secured to the table. The yoke I has a tongue engaging with a corresponding groove in its seat I', upon which it is adapted to move longitudinally, and is provided with journal-bearings in which the spindle M revolves, and is adjustable by means of set-screws 8 and 9, arranged at each end. Attached to the inner face of the bracket 20 is the angle-plate 18, carrying a roll 19, which is placed directly underneath the cutter G and which traverses the edge of a form 17, which is to be provided with an outline corresponding to that of one side of the stock to be operated upon and attached to one side of the carriage for causing it when traveling longitudinally to describe the same outlines, thus presenting the stock to the cutter in conformity to the form of the stock to be turned or operated upon.

The operation of my machine is substantially as follows: Motion being communicated to the spindle M by means of belt 13 from any suitable-power driven or wide-faced pulley, the head is caused to revolve rapidly, carrying the cutting-knives, which, by the adjustment permitted by the pivoted yoke, may be placed at any desired angle. The carriage being adjustably pivoted to the slide 3, as explained, is adapted to travel longitudinally either in a straight, serpentine, or other irregular line corresponding to the outlines of the work being operated upon, being guided in this respect by the outlines of the edge of the form 17. The guide 5 may be removed altogether when irregular forms are being operated upon, as I have found that the machine operates equally well upon most forms of work either with or without it. The carriage is withdrawn from the cutter-head by depressing the bell-crank lever V, which draws the slide 3 outward. The work is placed between the centers N N' and held by spurs upon sleeve O. When the hand-lever is released, the weight W operates to push the upper end of the lever over, carrying the carriage with it, until the edge of the form 17 comes in contact with wheel 19, which regulates and determines the distance from the center of the work to the cutter-head. By adjusting the spindle in a vertical position and using a form having a straight side, disconnecting the change-gears S S', and locking the center N, a plain cylinder may be fluted. The number of the flutes may be determined by shifting the pin Q to the hole in the arm P that is opposite the circle on the face-plate having the proper number of holes and shifting the position of said pin and arm as each flute is completed. To produce spiral flutes of the same pitch as the feed-screw, change-gears S S', having an equal number of teeth, are used to connect the feed-screw and driving-spindle; and if the pitch is to be greater or less than the feed-screw, by using gears of proper relative proportions, as in other similar machinery. By changing the caps 12' 12² either right or left hand spirals may be cut. For cutting opposite spirals the spindle M is oppositely inclined, and such inclination adjusted to conform to the pitch of such spiral. The inclination increases as the lead decreases. The belt 13 automatically adjusts itself upon the drum for each position of the spindle. For tapered or curved outlines or other irregular forms a form 17, corresponding to such tapered, curved, or irregular outline, is used, the guide 5 being changed to a serpentine or other irregular form accordingly, or dispensed with altogether, as previously explained.

Having thus described my invention, what I claim, and desire to secure by Letters Patent, is—

1. In a lathe for turning spirals, and in combination, a yoke pivoted to adjust in a vertical plane, a cutter-head arranged in a line with the axis of said pivot, secured to a spindle journaled in said yoke, a bar adapted to slide horizontally toward and away from said head, and a carriage provided with heads for supporting the work, adapted to move longitudinally across and attached to said bar, substantially as described.

2. In combination with a frame and table, a yoke pivoted to said table and adapted to be adjusted in a vertical plane, a spindle journaled to said yoke and carrying a cutter-head arranged in a line with the axis of said pivot, a bar adapted to slide horizontally toward and away from said cutter, a post secured to said bar, and a carriage provided with heads for supporting the work, and feed-screws for traversing the table longitudinally, and having a slot, as C', adapted to said post, said post being provided with a head, substantially as and for the purpose set forth.

3. In combination with a frame and table, a yoke pivoted to and pendent from said table, provided with a bolt, and a frame having a curved slot adapted to said bolt for adjusting the vertical inclination thereof, a cutter-head arranged to rotate in line with the vertical plane of said pivot, secured to a spindle journaled in said yoke, a bar attached to said table, adapted to slide horizontally toward and away from said head, provided with a lever and connections for operating said bar, a post provided with an enlarged head secured to said bar, and a carriage provided with heads for supporting the work and traversing it along the table attached to said post, substantially as described.

4. In combination with a frame and table and a cutter-head secured to a spindle journaled in a yoke pivoted to said table, the cutter-head being arranged in a line with the vertical plane of the axis of said pivot, a bar arranged in the same line, adapted to slide horizontally toward and away from said head, provided with a weighted lever fulcrumed in the same line and connections for operating said bar, a post having an enlarged head provided with a semi-cylindrical channel, a cap provided with a corresponding channel provided with threads secured to said head and forming a bearing for a feed-screw, said post being secured to said sliding bar, and a carriage having a longitudinal slot, as C', adapted to receive said post, and provided with heads for holding the work and engaging the feed-screw, for traversing it along the table, substantially as described.

5. The combination, with the frame and table, of the carriage C, centrally pivoted to the slide 3, substantially as described, the slide 3, the bell-crank lever V, provided with the weight W, and means of adjustment, substantially as described, ways D, heads E' E² E³, feed-screw F, gears S² S³, the shaft and crank T, centers N N', sleeve O, and means of adjusting said sleeve, arranged substantially as described.

6. The combination, with the frame and table, of the carriage C, provided with the centrally-arranged pivot-post 12, adapted to act both as a journal-bearing and pivot-post, and arranged at the end of the slide 3, substantially as described, and which is provided with the bell-crank lever V, weight W, and connections whereby said carriage may be moved transversely on said table, substantially as described, the ways D, heads E' E² E³, feed-screws F, gears S² S³, crank and shaft T, stops 11 and 4, form 17, arranged at the rear edge of C, the bracket 20, roll 19, and arm 18, whereby the said carriage is made to describe the outline of said form in traversing said table longitudinally, substantially as described.

7. In combination with a frame and table and a revolving cutting-head secured to a spindle, journaled in a yoke pivoted to said table, a bar arranged in a transverse groove in said table, a longitudinally-movable carriage mounted on said table, provided with heads for holding the work, pivoted to said bar, a form, as 17, secured to the edge of said carriage, and a bearing-roll, as 19, adapted to said form, secured to an arm secured to said table, said yoke-pivot, carriage-pivot, cutting head, and roll all being arranged in the same vertical plane, substantially as described, and for the purpose herein set forth.

8. In a lathe for turning spirals, and in combination a frame supporting a table resting thereon, a yoke-supporting bracket secured to said table, a spindle-carrying yoke pivoted to said bracket, having its outer end adapted to adjustment by a bolt adapted to a curved slot arranged in said frame concentric to said pivot, a spindle journaled in said pivoted yoke having a cutter-head provided with knives, a carriage pivoted on said table at a point opposite to the point of pivoting of said yoke and adapted to move transversely on said table, a form 17, secured to the edge of said carriage, and a roller placed in an arm secured to said yoke-supporting bracket, a feed-screw adapted to be operated by a hand-crank journaled in suitable heads secured to said carriage, and centers adapted for holding the work parallel with said feed-screw and opposite to said cutter-head, all arranged to operate substantially as described.

In testimony whereof I affix my signature in presence of two witnesses.

MICHAEL BROCHU.

Witnesses:
DENNIS L. ROGERS,
LUTHER V. MOULTON.